(12) United States Patent
Fotland

(10) Patent No.: US 6,873,438 B2
(45) Date of Patent: Mar. 29, 2005

(54) METHOD OF IMAGE COLOR CORRECTION

(76) Inventor: Richard A. Fotland, 1 Crab Apple La., Franklin, MA (US) 02038

( * ) Notice: Subject to any disclaimer, the term of this patent is extended or adjusted under 35 U.S.C. 154(b) by 869 days.

(21) Appl. No.: 09/867,884

(22) Filed: May 30, 2001

(65) Prior Publication Data

US 2001/0048529 A1 Dec. 6, 2001

Related U.S. Application Data

(60) Provisional application No. 60/208,159, filed on May 31, 2000.

(51) Int. Cl.[7] .............................. G06K 15/00; G06K 9/40
(52) U.S. Cl. ........................ 358/1.9; 358/1.2; 358/3.2; 358/3.26; 358/3.29; 358/520; 382/274
(58) Field of Search ......................... 358/1.9, 1.2, 3.2, 358/3.26, 3.29, 515, 517, 518, 520, 527; 382/167, 274, 162; 345/589, 603, 604, 472, 472.1, 472.2, 472.3, 629; 359/16

(56) References Cited

U.S. PATENT DOCUMENTS

| | | | | |
|---|---|---|---|---|
| 4,404,590 A | | 9/1983 | Mayer et al. ................ 348/129 |
| 5,579,031 A | * | 11/1996 | Liang ......................... 345/604 |
| 5,764,209 A | * | 6/1998 | Hawthorne et al. ........... 345/87 |
| 5,963,670 A | * | 10/1999 | Lipson et al. ................ 382/224 |
| 6,580,823 B1 | * | 6/2003 | Englefield et al. ........... 382/162 |
| 6,628,822 B1 | * | 9/2003 | Nakabayashi et al. ....... 382/162 |
| 2001/0024326 A1 | * | 9/2001 | Nakamura et al. ........... 359/618 |

* cited by examiner

Primary Examiner—Jerome Grant, II

(57) ABSTRACT

Method of printer color error correction employing the rapid alternate viewing of a scanned original color image file and an image file formed by scanning an image printed by the printer whose error is to be corrected. Color errors appear as a blinking or flickering feature in the viewing monitor. Adjustments are made to the original color image file to eliminate or minimize flicker. The adjusted color file is then employed in printing a color corrected image. Another embodiment provides the method of the invention for real time color correction in images printed on conventional or digital printing presses.

14 Claims, 3 Drawing Sheets

METHOD OF IMAGE COLOR CORRECTION

This application claims the benefit of Provisional Application No. 60/208,159, filed May 31, 2000.

This invention relates to a new and improved method for modifying digital image files to compensate color errors introduced in printing or other image conversion processes. The method of this invention employs simple and direct comparisons of an original (reference) image and its printed image using a digital blink comparator to provide a rapidly alternating overlaid display of the two images on the screen of a color monitor. While viewing the monitor, the operator adjusts the digital color file to bring the two images into a blink free state.

BACKGROUND OF THE INVENTION

The accurate reproduction of color images is very difficult because of the great color variation sensitivity of the human eye. Inks and toners of the same assumed color show variations from between different manufacturers and even between different batches. Maintaining color consistency over long press runs requires constant sampling and "eyeball" comparison of "pulled" samples to an original using special "daylight" illumination. Color copier color adjustments must be carried out to compensate aging of copier consumables and sub-assembly components.

The principle of blink comparison is well known in the field of astronomy, and optical blink comparators are used to identify anomalous astronomical events. A picture of the sky or portion of the sky at an earlier reference time provides a reference image. Astronomical comparisons are made of the same portions of the sky at a later time for discovering the subsequent occurrence of novae or other celestial events not present in the reference image. The discovery of the planet Pluto was made by Clyde Tombaugh in 1929 using a Carl Zeiss blink comparator.

According to one prior art method described in U.S. Pat. No. 4,404,590 (Ben Mayer et al, Sep. 13, 1983), a reference image is captured using a video camera while a comparison image or data image is imaged using a second video camera. The two images are superimposed at a low alternating frame rate on a video screen. Adjustments are carried out to geometrically align the two images and then any variation between the image pairs is detected as a blinking feature.

OBJECTS OF THE INVENTION

It is therefore an object of the present invention to provide an improved method for adjusting color digital files to compensate for errors in printers, copiers, or other image conversion devices. A further object is to provide a method for providing printing press image color adjustments in real time. Thus, continuous adjustment for print quality may be carried out during press runs. Another objective is to provide for the proper setup and calibration of pre-press proofing devices. While primarily directed to printing color correction, the method of this invention may also be employed in medical diagnostics where the image correction provides a quantitative measure of changes in false color radiographs, CAT scan imagery and the like. Similarly, the method of the invention may be utilized in false color non-destructive testing applications.

While the method of this invention may be carried out automatically using algorithms to adjust the color files to minimize changes, the human eye is preferred since color appearance is very subjective and difficult to define quantitatively. The subjective appearance of a color, for example, is very dependent upon surrounding color fields. Placing a human operator in the feedback loop provides a direct comparison that encompasses many various aspects of human vision that would be impossible or at least very difficult to simulate with algorithms.

METHOD OF THE INVENTION

This invention provides a method of adjusting digital image files in order to compensate for errors in the printing process that prevent a printed copy from exactly matching an original. In color printing, in particular, color errors due to ink characteristics and press setup are almost inevitable. A color image is scanned and the component colors digitized and stored as color separation files. In general, four files (yellow, cyan, magenta, and black) are created. A color printer generally has four print stations each printing one of the so-called process colors.

Very often, an original is created on a computer. An output image is printed, typically on a small ink jet printer, and the computer image file adjusted until the printed output matches the desired copy. Press plates are generated using the digital image files and a proof is printed. After much trial and error, the press job is printed.

The method of the present invention overcomes limitations in previous methods of image compensation and particularly color compensation. Using the method of the invention, an original is scanned, saved as a first digital file, and then the file is printed employing the printer whose output is to be corrected. The output of the printer is then scanned and the image saved in a second image file. After registration of the overlapping images on a video display screen, the stored images from the first and second digital files are viewed in rapid sequence. Any image variation will show up immediately as a color-blinking region in the viewed sequence. Digital image control means, either through hardware or software, is provided to allow the viewer to change the second digital file until the image blink is eliminated or minimized. The second image file is now compensated so that images printed using the compensated printer and the second file will very closely match the original.

Figure 1:
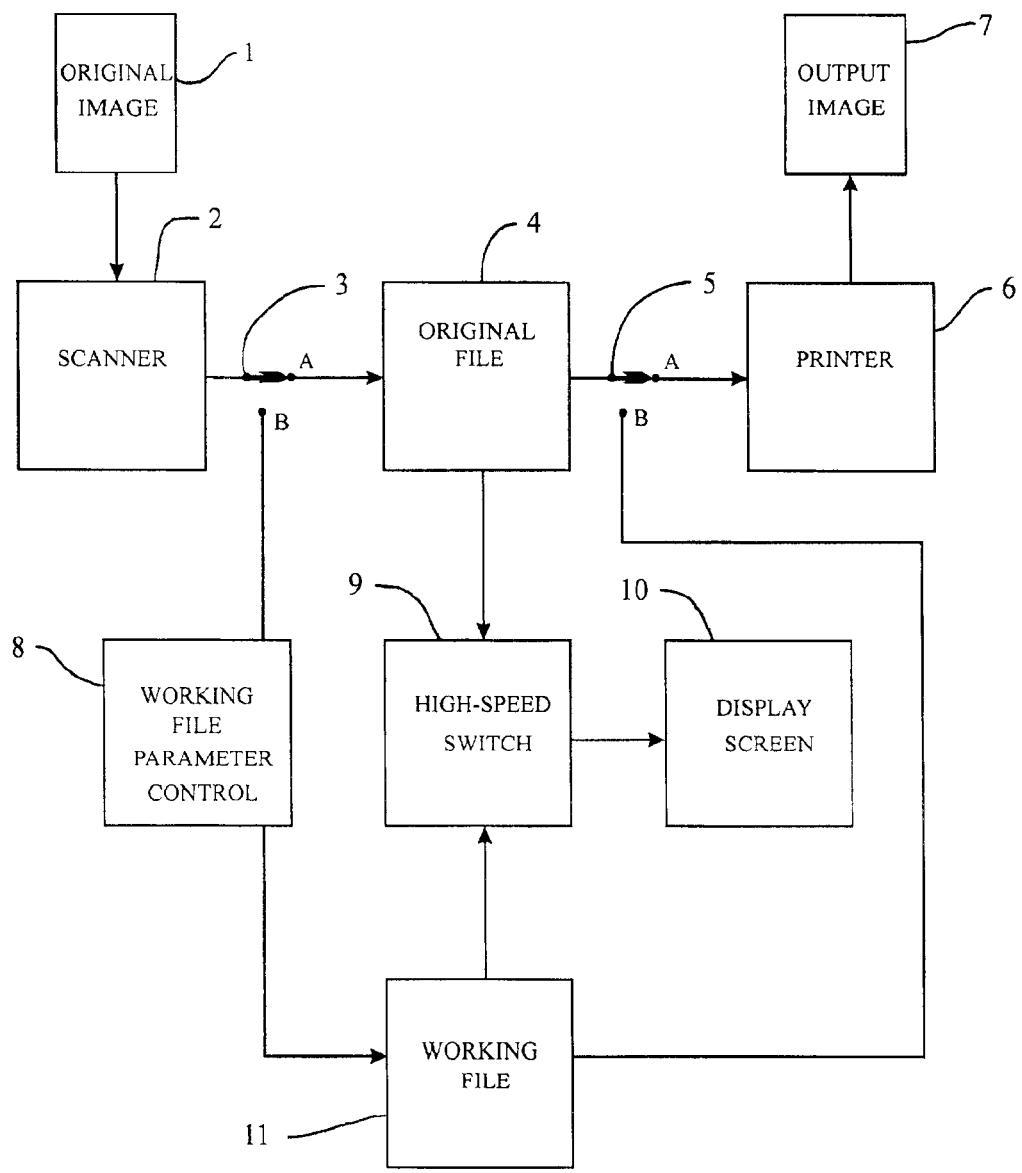
FIG. 1 shows a block diagram of hardware employed in carrying out the method of the invention.

The schematic block diagram of FIG. 1 illustrates one implementation of the present method. The method may be understood with reference to FIG. 1 and consideration of the following process steps:

1. Original image 1 is digitally color scanned with scanner 2 while switch 3 is set to position "A" to generate a set of digital color image files stored in original file 4.
2. Switch 5 is set to position "A" and file 4 is printed by printer 6 to yield printed output image 7.
3. The original image 1 is replaced with printed image 7 printed in step 2.
4. Switch 3 is set to position "B" and printed image 7 scanned to form a set of digital color image files that are stored in working file 11. During this scan, the image file parameter control 8 is set so that the scanned data is not modified and the scanned image data is thus stored in the working file without modification.

5. The high-speed switch 9 is set to alternately display files 4 and 11 in display monitor 10. Adjustments, described later, are performed to correct geometric distortion so that image blink is only due to gray level or color level (hue, saturation, or lightness).
6. The image file parameter control is manually adjusted to minimize or eliminate image blink on the monitor.
7. Switch 5 is set to position "A" and file 11 printed.

The output printed from file 11 is seen to very closely resemble the original. The parameter control settings are saved to a printer digital image control file.

In order to compare colors or optical density using the blink technique, the two images being compared must be registered to prevent registration error blinking. X, Y, and rotational errors may be adjusted visually using software control of one of the image's position and magnification. If registration errors persist, due, for example, to non-linear shrinkage of the printed paper, then the images may be degraded by employing a low pass filter to soften and blur the image feature edges. It is well known that the eye loses color recognition in small details and thus this form of image degradation will not affect the utility of this invention in managing color and grayscale reproduction. In printing the final product, the low pass filter is, of course, not used.

The blink frequency must not be set too high or color blending will occur. It has been determined that a blink frequency between about 0.2 and about 5 image alteration cycles per second covers the useful range and that a preferred frequency is 1 to 2 blinks per second.

Figure 2:
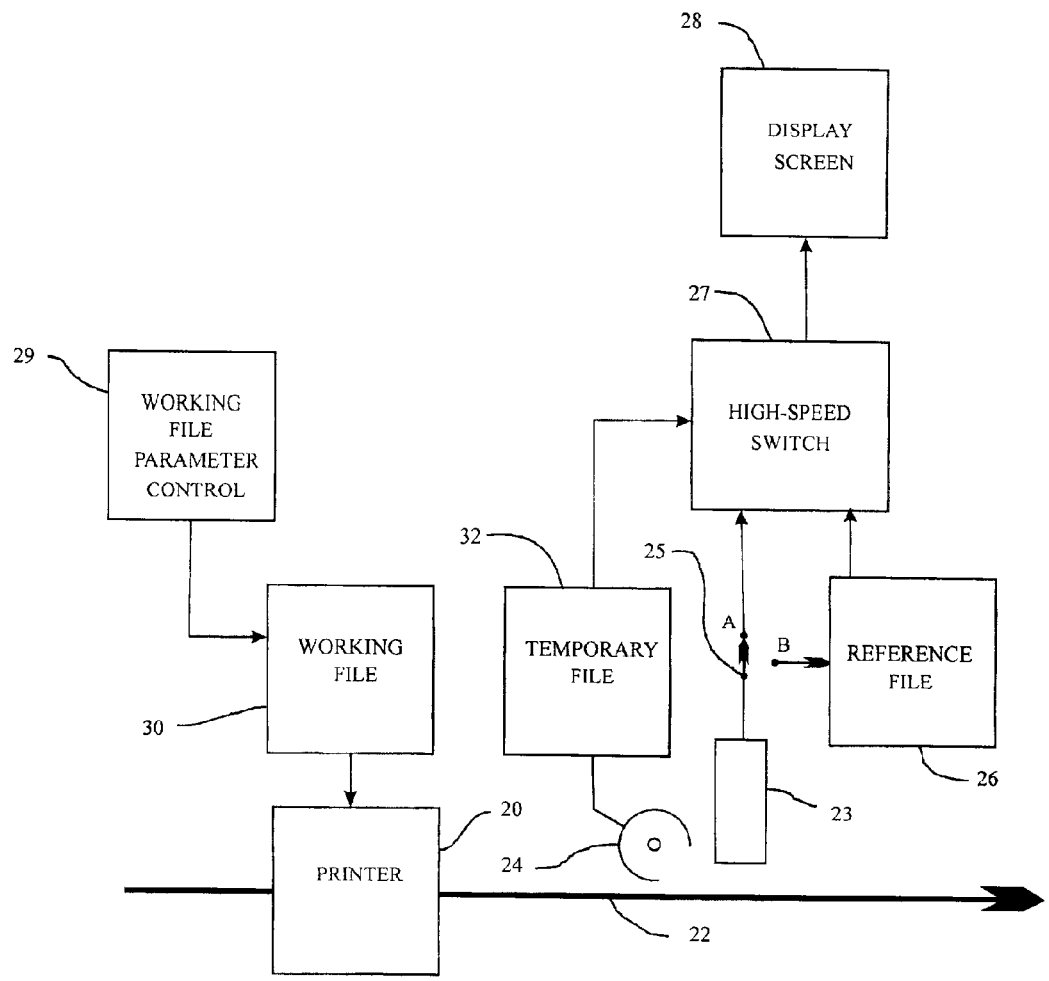
FIG. 2 is a block diagram of another embodiment of the invention that provides for real time color correction in digital presses.

A second implementation of the invention is shown in FIG. 2. Here, real-time color control would be implemented by strobe light imaging the output image of a press during the printing process to freeze the image and then comparing the image to a digitally stored reference image using a blink comparator. The strobed image is stored in digital temporary file 32. The printed image is periodically updated to provide near real time comparison between the reference image and the printed image. Errors are visually compensated with compensation settings fed back to either the press ink controls or to the digital input signal to provide a running fix for compensating press color drift.

In FIG. 2, an image is printed on web 22 employing digital printer 20. Although only one print station is shown in FIG. 2, it is understood that four or more print stations may be employed in multi-colored printing applications. Data to be printed is stored in working digital image file 30. A working file parameter control 29 permits the press operator to modify the printed image hue, saturation, or lightness. The printed image is presented to the press operator by imaging the printed image using digital camera 23 and strobe illuminator 24. The image is viewed on display monitor screen 28. The real time viewed image is alternated with a stored image provided by digital reference file 26. High-speed switch 27 is employed to rapidly alternate the displayed image between the real time printed image and the stored reference image. The reference file image is obtained from a printed image recorded by camera 23 with switch 25 in position "A". This switch is set to position "B" during the normal press run.

If the image being printed does not vary, then the press is set up to provide a press-proof. When the proof is accepted, then the proof image is imaged and stored as the reference file. During the press run, the operator observes display screen 28. If flicker is observed, then the operator manually adjusts working file parameter control 29 to minimize or eliminate flicker. If variable images are being printed, then a test pattern must be run to provide a reference file and periodic test patterns also run to provide a sample real-time image.

Figure 3:
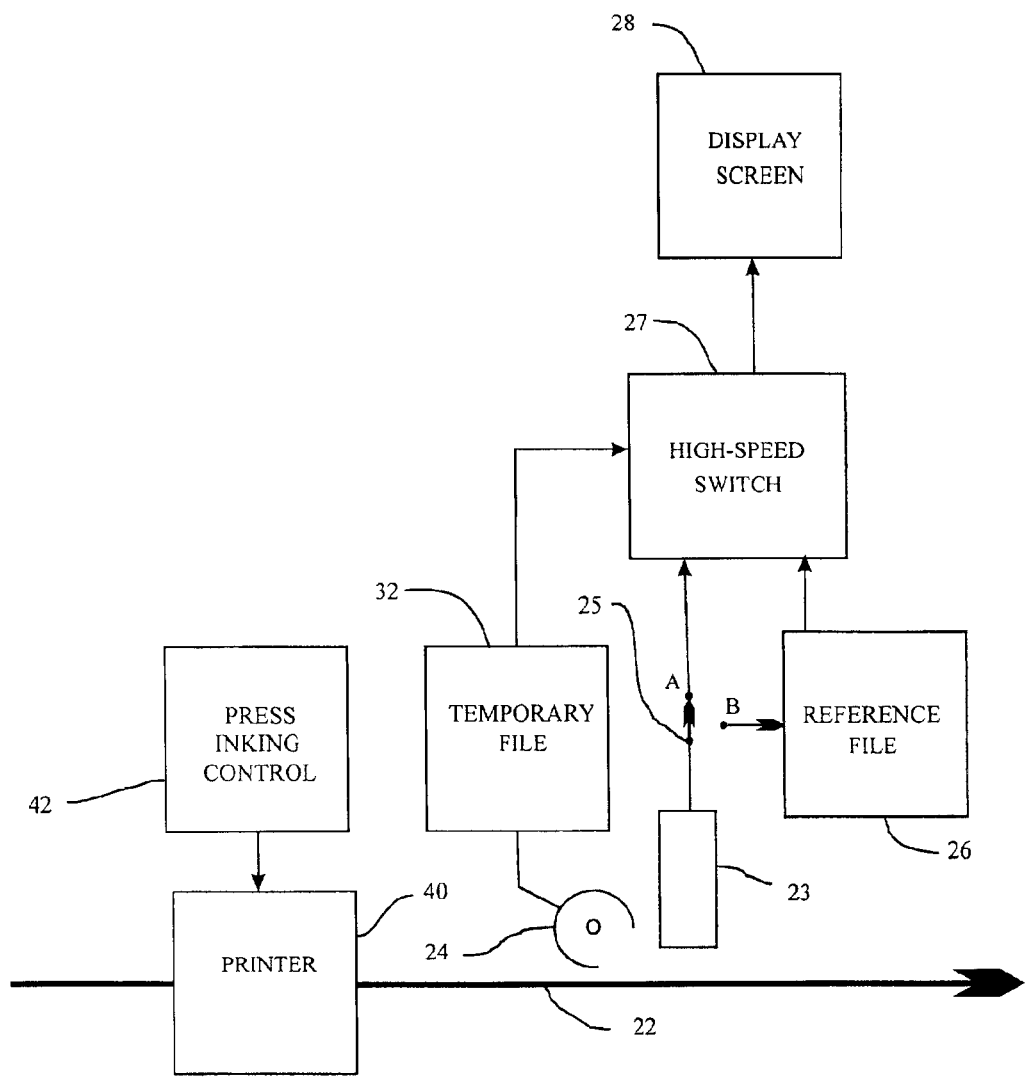
FIG. 3 is a block diagram of another embodiment of the invention that provides for real time color correction in conventional printing presses.

FIG. 3 employs the same scheme as shown in FIG. 2 to compensate for press drift in image output except that the printer 40 is now a conventional printing press station. This press unit may be employ offset lithography, gravure, letterpress, screen-printing, or the like. If the operator senses flicker in display screen 28, then he or she adjusts press inking control 42 until the blinking is minimized or eliminated.

Another application of the present invention provides numerical output of changes between two images relating to medical imaging or non-destructive testing imaging. An image such as a medical X-ray, CAT scan, NMR image, or non-destructive X-ray image is first converted from a gray scale image to a false color image. This conversion provides a much wider dynamic range since the human eye is able to discriminate many more colors than gray scale density differences. An image may be compared to another image taken earlier or to another image taken prior to introducing a contrast media into the subject. The blink comparator is employed to cancel out variations in color shift and the magnitude of the compensation level then provides a numerical indication of the image change.

In addition to using the method of the invention to provide color correction to images, the method may also be employed using test patterns that are printed in the image margins. Such patterns, typically four color step tablet strips, are often employed in commercial presses to assist the operator in maintaining color fidelity. Using the method of the invention, original known correct printed test color strips would be blink compared to the printed strips being printed in real time on the press.

Although the invention has been described herein with reference to a specific embodiment, many modifications and variations therein will readily occur to those skilled in the art. Accordingly, all such variations and modifications are included within the intended scope of the invention.

What is claimed is:

1. A method of correcting color image reproduction errors in digital printing devices which includes the steps of:
   digitally scanning an original image and storing the scanned data in a first digital file,
   printing said first digital file employing the digital printing device whose errors are to be compensated thereby generating a color distorted print,
   digitally scanning said color distorted print and storing the image in a second digital file,
   alternately viewing the images stored in said first digital file and said second digital file on a display device,
   adjusting the display size and position of said first and said second digital file so that the two images overlap,
   adjusting the color parameters of hue, saturation, and brightness of said second image file to minimize color flicker and brightness flicker in the apparent image viewed in said display device, and
   printing the adjusted said second digital file to provide a duplicate color print that closely matches said original image.

2. The method of claim 1 where said first digital file and said second digital file are each composed of four digital memory planes corresponding to the color information in the yellow, cyan, magenta, and black portions of said original and said duplicated color print.

3. The method of claim 1 where the images stored in said first digital file are alternately viewed superimposed with the images stored in said second digital file at an alternating viewing frequency between about 0.2 and about 5 image changes per second.

4. The method of claim 1 where the images stored in said first digital file and the images stored in said second digital file are both blurred to remove high frequency special components from appearing in said display device.

5. A method of correcting color reproducing errors in digital printing presses which includes the steps of:

digitally scanning an original image and storing the scanned data in both a digital reference image file and a digital printing press working image file printing said digital printing press working image file thereby generating a color distorted print, digitally scanning said color distorted print and storing the image in a digital temporary image file, alternately viewing the images stored in said digital reference image file and said temporary digital image file on a display device, adjusting the display size and position of said reference and said temporary digital image files so that the two images overlap, adjusting the color parameters of hue, saturation, and brightness stored in said press working image file to minimize color flicker and brightness flicker in the apparent image viewed in said display device thereby providing a digital press printed duplicate color print that closely matches said original image.

6. The method of claim 5 where said working image file, said reference image file, and said temporary image file are each composed of four digital memory planes corresponding to the color information in the yellow, cyan, magenta, and black portions of said original and said printed color print.

7. The method of claim 5 where the images stored in said reference image file are alternately viewed superimposed with the images stored in said temporary image file at an alternating viewing frequency between about 0.2 and about 5 image changes per second.

8. The method of claim 5 where the images stored in said reference image file and the images stored in said temporary image file are both blurred to remove high frequency special components from appearing in said display device.

9. The method of claim 5 where the stored image in the temporary image file is periodically updated with a new digitally scanned image.

10. A method of correcting color reproducing errors in printing presses which includes the steps of:

digitally scanning an original image and storing the scanned data in a digital reference image file, preparing and mounting press printing plates corresponding to the original image, printing reproductions of said original image, digitally scanning said printed reproduction and storing said scanned image in a digital temporary image file, alternately viewing the images stored in said digital reference image file and said temporary digital image file on a display device, adjusting the display size and position of said reference and said temporary digital image files so that the two images overlap, adjusting the inking and press process controls to minimize or eliminate flicker in said display device, thereby providing press printed duplicate color prints that closely match said original image.

11. The method of claim 10 where said reference image file and said temporary image file are each composed of four digital memory planes corresponding to the color information in the yellow, cyan, magenta, and black portions of said original and said printed reproduction.

12. The method of claim 10 where the images stored in said reference image file are alternately viewed superimposed with the images stored in said temporary image file at an alternating viewing frequency between about 0.2 and about 5 image changes per second.

13. The method of claim 10 where the images stored in said reference image file and the images stored in said temporary image file are both blurred to remove high frequency special components from appearing in said display device.

14. The method of claim 10 where the stored image in the temporary image file is periodically updated with a new digitally scanned image.

\* \* \* \* \*